Jan. 19, 1960 W. MORRIS 2,921,723
CONDIMENT SHAKERS
Filed May 19, 1958 3 Sheets-Sheet 1

INVENTOR
William Morris
BY Rockwell & Bartholar
ATTORNEYS

Jan. 19, 1960 W. MORRIS 2,921,723
CONDIMENT SHAKERS
Filed May 19, 1958 3 Sheets-Sheet 2
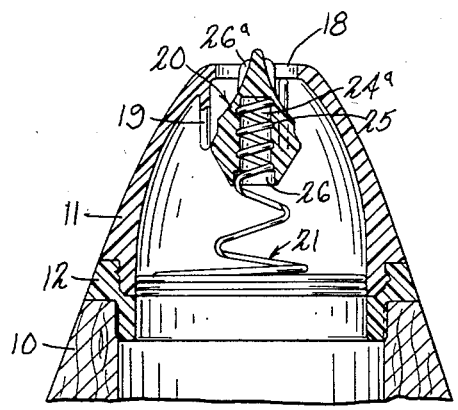
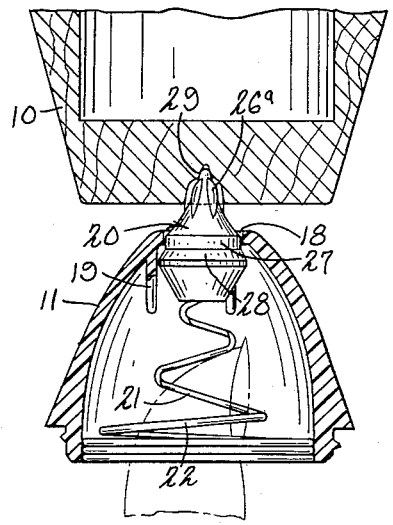
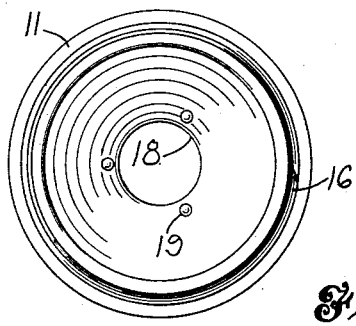
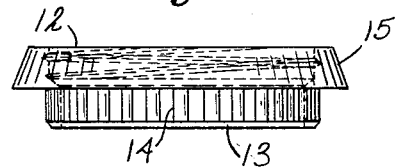
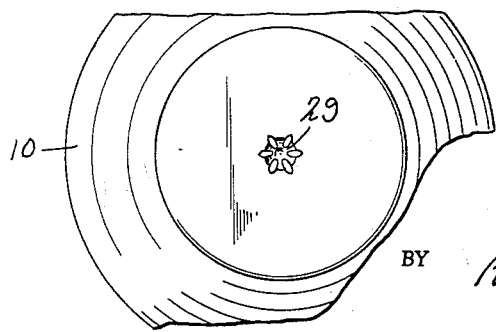
INVENTOR
William Morris
BY Rockwell & Bartholow
ATTORNEYS

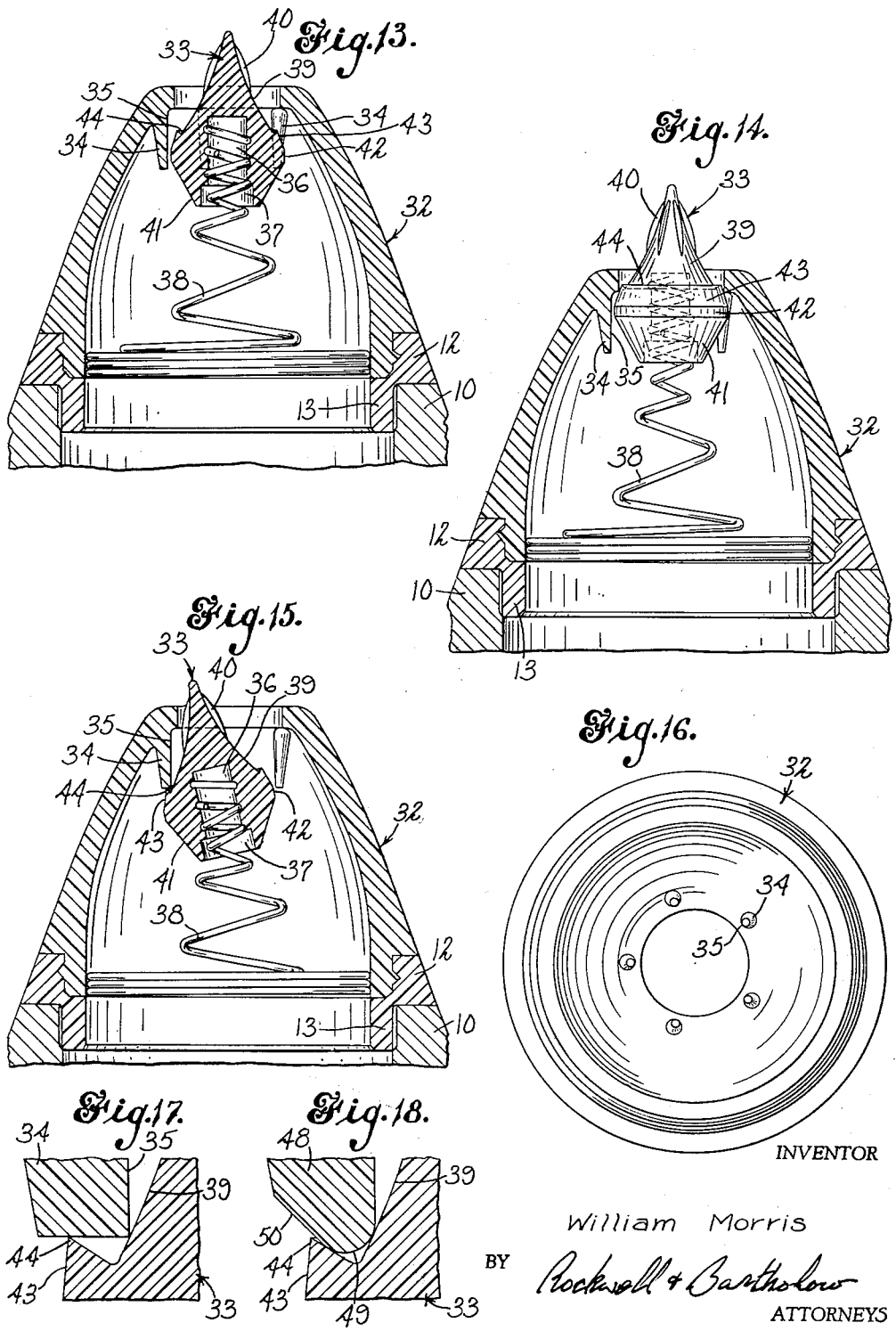

United States Patent Office 2,921,723
Patented Jan. 19, 1960

2,921,723
CONDIMENT SHAKERS
William Morris, New Haven, Conn.
Application May 19, 1958, Serial No. 736,394
14 Claims. (Cl. 222—501)

This invention relates to condiment shakers and relates more particularly to improvements in the construction and arrangement of elements in a condiment shaker of the type illustrated and described in U.S. Patent No. 2,779,518, issued January 29, 1957, and comprising a casing having means providing a dispensing orifice, and also comprising a threaded plug or valve member resiliently mounted in the casing cooperating with the orifice and adjustable to vary the flow of condiment from the shaker. The instant application is a continuation-in-part of a pending earlier application, Serial No. 697,371, filed November 19, 1957, now abandoned.

One object of the invention is to provide an improved condiment shaker of the type characterized above.

Another object of the invention is to provide in a shaker a novel and very efficient valve or plug member.

Still another object of the invention is to provide a novel and very satisfactory support for the valve or plug member, which permits adjustment of the latter.

Further objects of the invention will be apparent from the following detailed description of three forms of the condiment shaker shown in the accompanying drawings.

In the drawings:

Fig. 8 is a view similar to Fig. 3 but illustrating the plug member in another adjusted position;

Fig. 9 is a fragmentary elevational sectional view showing the cap removed from the body and showing how the plug member may cooperate with the bottom of the body to aid in turning adjustment of the plug member;

Fig. 10 is a bottom view of the cap;

Fig. 11 is an elevational view of an adaptor ring which, in the assembled shaker, is interposed between the cap and the body;

Fig. 12 is a fragmentary bottom view of the body;

Fig. 13 is a view similar to Fig. 3, illustrating a modified form of the shaker;

Fig. 14 is a view similar to Fig. 4, illustrating the shaker of Fig. 13;

Fig. 15 is a view similar to Fig. 5, illustrating the cooperation of the cap structure and the plug member in the modified form;

Fig. 16 is a view similar to Fig. 10, illustrating the cap structure of the modified form;

Fig. 17 is an enlarged fragmentary view in vertical section illustrating the cooperation of the last-mentioned cap structure with the plug member; and Fig. 18 is a view similar to Fig. 17, illustrating a further modification.

Figure 1:
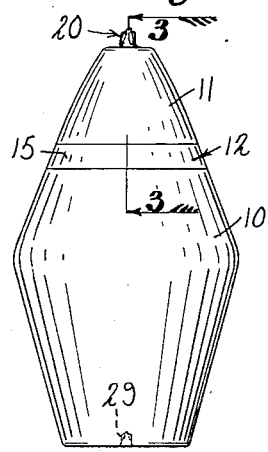
Fig. 1 is an elevational view of a condiment shaker embodying the invention.
Figure 2:
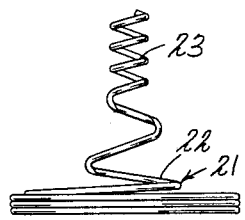
Fig. 2 is an enlarged detail view of the spring member employed in the shaker.
Figure 3:
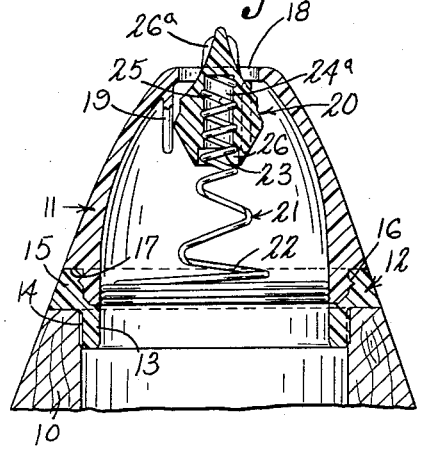
Fig. 3 is a sectional view on the same scale as the last figure and taken on line 3—3 of Fig. 1, the plug member being shown in one of its open and adjusted positions.

In the form illustrated in Figs. 1 through 12, there is provided a condiment shaker comprising a hollow tapered body 10, a tapered cap 11 and a tapered adapter ring 12 which, together with the body 10 and the cap 11, forms a casing or container for condiment. The body 10 may be formed of metal, plastic or other suitable material, and in the form shown is constructed of wood. The cap 11 is preferably formed of molded or cast plastic material, as shown, but may be formed of other suitable material. The adapter ring 12, which is interposed between the plastic cap and the wood body, is shown as being formed of plastic but may be constructed of any suitable material. The ring may be formed by any conventional shaping process. The adapter ring 12, best shown in Fig. 11, is provided with a lower tubular part 13 extending into the top of the body and having a close fit therewith, the external surface of the part 13 being serrated or roughened, as at 14, to grip the sides of the body 10. The ring 12 is provided with an upper circumferential and externally tapered flange 15 which is internally threaded to receive the threaded portion 16 of the cap, in the manner shown in Fig. 3. As best shown in Fig. 3, the cap is provided with an overhanging shoulder 17 which fits snugly against the top of the adapter ring when the shaker is assembled, the arrangement being such that the cap is flush with the adapter ring. As shown in Fig. 3, for example, the ring is also flush with the body 10.

Figure 5:
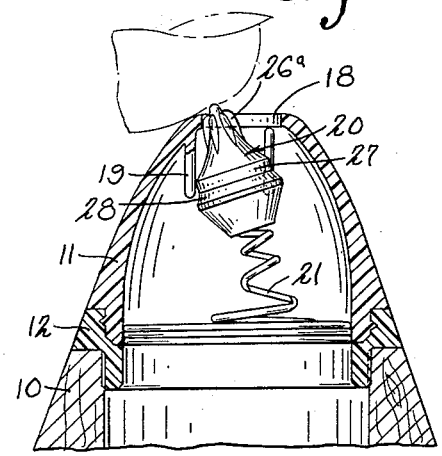
Fig. 5 is a view similar to Fig. 4 but showing the plug member depressed from the position of Fig. 4 to permit a quick and heavy flow of condiment from the shaker.
Figure 6:
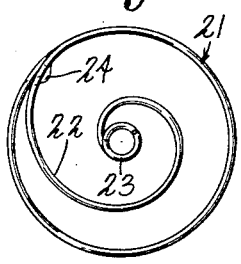
Fig. 6 is a top plan view of the spring member.

A round (Fig. 10) condiment-dispensing opening 18 is formed in the top of the cap and a plurality of downwardly extending pin-like projections 19 are circumferentially spaced apart around the opening 18, three of these projections being shown in Fig. 10. The projections 19, which are engageable with the circumference of the member 20, may be formed integrally with the cap, if desired, and serve to maintain the plug member 20 in captive and concentric relation to the opening 18 when the plug member is not depressed and canted by finger pressure thereon. The canted position of the plug member 20 is shown in Fig. 5. The circumferentially spaced pin-like projections 19, which may be rounded at their lower ends, cooperate with the plug member 20 in a manner which will appear more fully hereinafter.

Figure 7:
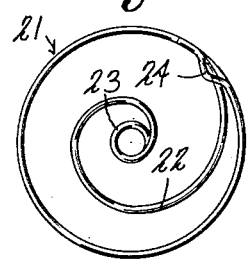
Fig. 7 is a bottom view of the spring member.

The plug member 20 is supported in the cap by the spring member 21 formed of wire. The spring member 21 preferably has three complete turns or coils of substantially uniform diameter at the lower end thereof, and closely approximating the internal diameter of the lower portion of the cap. These turns form the base or lower terminal portion of the spring member for support by the cap. The lowermost turn, for example, may be secured to the cap by a suitable cement, not shown. The spring member 21, which, as previously indicated, is of coil form, has a turn 22 directed sharply inwardly from the third turn from the bottom and merging with a screw-like part 23 extending in an upward direction. As shown in Fig. 2, the screw-like part 23 is of substantially uniform diameter throughout its length and forms the upper end of the spring member 21, this part being of much smaller diameter than the aforementioned three turns of the spring. As best shown in Fig. 7, the lowermost turn of the spring member 21 is provided with an inwardly bent stop portion 24 in the area of the lower terminal of the wire from which member 21 is formed. The stop portion 24 cooperates with the sharply inwardly directed turn 22 of the member 21 under certain operating conditions which will appear hereinafter. The screw part 23 of the spring member is formed substantially concentrically of the three lower turns of the member, as indicated in Figs. 2 and 7.

The plug member 20, which is shown as being formed of plastic material, and which may be shaped in any conventional manner, cooperates with the screw part 23 of the spring member. The plug member 20 extends upwardly and is formed so as to be open at the bottom, providing an upwardly extending concentric bore 24ª having an upper threaded part 25 and an enlarged lower part 26. The screw part 23 of the spring member is threaded into the threaded part 25 of the plug member, the arrangement preferably being such that the screw part binds in the threaded part 25 to an extent that the plug member offers some resistance to turning movement of the latter by the fingers. Inasmuch as the upper tip of the plug member is small and of generally tapered form, it is, under most conditions, difficult to grasp and turn and, therefore, the plug member is substantially tamperproof. As shown in Fig. 5, the upper tapered tip of the plug member is fluted, as at 26ª, to facilitate threaded adjustment of the member, and below the fluted tip the plug member is provided with a substantially cylindrical part 27 which, in the position of the plug member shown in Fig. 4, substantially fills the opening 18 in the cap. Directly below the portion 27, the plug member is provided with an upwardly tapered part 28 which, in the last-mentioned position of the plug member, abuts against the underside of the cap and seals the dispensing opening 18. When the plug member is in this position the entrance of moisture into the shaker is very strongly inhibited.

As mentioned above, the construction and arrangement of the plug member 20 is such that tampering with the plug member rarely, if ever, renders the shaker inoperative. The plug member 20 will not pass entirely through the dispensing opening 18 of the cap, nor can the plug member 20 be separated from the spring member 21 by grasping the plug member 20 above the cap and turning the plug member in an unthreading direction, as the spring member, when completely unthreaded, is held captive in the unthreaded enlargement 26 of the bore. It may be noted that when the tapered portion 28 of the plug member is moved to strike the cap around the dispensing opening 18, the plug portion 28 tends to break up any encrustation of condiment around the opening.

Figure 4:
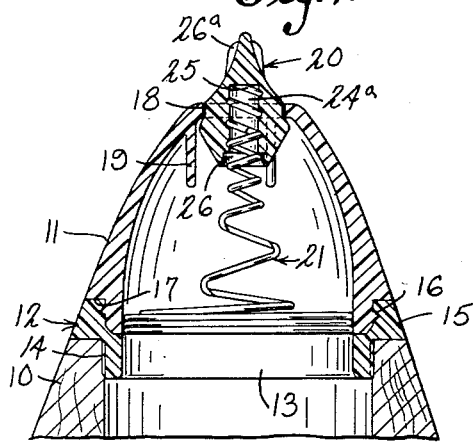
Fig. 4 is a view similar to Fig. 3 but illustrating the plug member in the closed position thereof.

To threadedly adjust the plug member 20 from the closed position of Fig. 4 to the adjusted position of Fig. 3, the cap 11 may be removed from the adapter ring 12 and the spring-urged plug member pressed upwardly and held in this position by finger pressure, as shown in Fig. 9. When the plug member is held in raised position in this manner the fingers of the other hand may be employed to grasp and twist the outer tip of the plug member to thread the last-mentioned member downwardly in the cap, or, as shown in Fig. 9, a complemental recess 29 formed in the bottom of the body 10 may receive the fluted outer tip of the plug member in angularly rigid relation thereto so that subsequent turning movement of the body 10 effects turning movement of the plug member.

To increase the flow of condiment from the shaker the plug member may be threaded downwardly in the cap from the position of Fig. 3 to the position of Fig. 8. To momentarily increase the flow of condiment from the shaker, as for cooking purposes, the plug member may be depressed by finger pressure on the top thereof, as shown in Fig. 5. An increased flow may be obtained by tipping or canting the plug member to one side, as shown in the last-mentioned view. However, to cant the plug member the member must first be depressed to the extent that the widest point thereof clears the downward projections 19 of the cap. Usually when the plug member is tipped in this fashion it is not depressed far enough for the turn 22 of the spring member to strike the stop portion 24 of the member. However, if the plug member is depressed at too great an extent, the stop portion 24 is engaged by the turn 22 of the spring member to prevent the coils from catching on one another in a manner that might result in failure of the spring member to return the plug member to its initial position. Thus it will be understood that the engagement of the turn 22 with the stop portion of the spring member serves to inhibit permanent dislocation of the coils and mutilation of the spring member which might result in failure of operation of the plug member. It will be understood that the pin-like projections 19 on the cap serve to guide the plug member in its up and down movement in the cap and also hold the plug member in concentric relation to the spring to avoid fatigue of the latter when the plug member is in the position of Fig. 3, for example.

The construction of the spring member 21 with the sharply inwardly directed turn 22 merging in the screw-like part 23 reduces to a minimum the area of the spring blocking the flow of condiment to the dispensing opening 18. Furthermore, the provision of an internally threaded plug member avoids the necessity of providing on the member an externally threaded stem portion for cooperation with the spring member, thereby tending to reduce to a minimum the area of the plug member blocking the flow of condiment through the dispensing opening. Of course, the reduction of the mass of the spring and plug members tends to reduce production costs. Furthermore, the assembly of the plug member with the spring member is simplified.

The form of the condiment shaker shown in Figs. 13 through 17 is identical to that shown in Figs. 1 through 12 except in the construction of the cap and spring and the construction of the plug member. In the modified form, the cap is indicated generally at 32 and the plug member generally at 33. The cap 32 may be identical in all respects to the cap 11 except for the downward pin-like projections on the cap which are spaced circumferentially around the dispensing orifice. In the modified form these projections are indicated at 34 and may be of the same form as the pin-like projections 19. However, as shown in Figs. 13 through 17, the projections 34 are of a somewhat different form and are greater in number. As shown in Fig. 16 by way of example, five of the pin-like projections 34 are employed on the cap 32 instead of the three projections 19 shown in Fig. 10. A larger number of pin-like projections is employed on the cap 32 so that the projections may be spaced a shorter distance apart. The reason for this will be apparent hereinafter. The pin-like projections 34 may be formed conveniently as integral parts of the molded cap or be formed by other suitable means, if desired. The projections 34 have the shape of depending truncated cones with their bases uppermost. This effects greater strength of the projections at their junctions with the upper part of the cap. It will be noted that each truncated cone 34 is arranged so that its axis is inclined to the vertical axis of the cap. The arrangement is such that the downwardly extending surface portion, indicated at 35, which is nearest the vertical axis of the cap, is arranged parallel to the last-mentioned axis. It will also be noted that, as shown in Fig. 13, the lower end of the cone-like projection 34 is not truncated at right angles to its axis but is truncated at an angle normal to the vertical. The upper end of the cone-like projetcion 34 where it joins the upper part of the cap is not truncated at right angles to the axis of the cone but is truncated in a plane forming an oblique angle with the last-mentioned axis.

The plug member 33 may have an upwardly extending dead-end bore axially thereof which is somewhat shorter than the bore 24ª in the plug member 20, the bore in the member 33 being indicated at 36. The outer end of the bore is enlarged, as at 37, and the inner end of the bore is threaded to receive a few turns of the spring 38, the screw part of the spring 38 being somewhat shorter than that of the spring 21 described above. The spring 38 is in all other respects similar to the spring 21 and may be supported in the cap in the same manner.

The upper part of the plug member 33 is generally tapered, as at 39, and is provided with flutes or ribs 40. The plug member may be threaded upwardly and downwardly on the spring 38 like the plug member 20. The lower part of the member 33 is provided with a taper opposite the taper of the upper part, the taper of the lower part being indicated at 41. Adjoining and upwardly of the lower tapered portion 41 the plug member is provided with a substantially cylindrical portion 42. Directly above the portion 42 the plug member is provided with a tapered portion 43 which, in the position of the plug member shown in Fig. 14, is in sealing engagement with the means defining the orifice or dispensing opening in the top of the cap. As shown in Fig. 13 for example, the taper of the portion 43 is in a direction opposite the direction of the taper 41 and is a more gentle taper. The tapered portion 43 of the plug member terminates at its upper extremity in an upwardly facing shoulder 44 extending circumferentially of the plug member and formed directly below the upper taper portion 39 of the plug member. The circumferential or annular shoulder 44 may be of a depth of approximately four-thousandths of an inch but may vary with the size of the condiment shaker. The shoulder 44 is adapted to cooperate with the distal ends of the pin-like projections 34 and is inclined upwardly and outwardly, as shown in Fig. 17.

As previously indicated, the plug member is shown in its closed position in Fig. 14. To obtain condiment from the shaker when the plug member is in the position of the last-mentioned view, the plug member may be momentarily moved inwardly by finger pressure when the shaker is inverted. The plug member may be moved inwardly by finger pressure to a position similar to the position of the plug member shown in Fig. 13. If desired, the plug member may be threaded inwardly on the spring 38 to the partially open position of Fig. 13. It will be understood that when this adjustment is made the plug member tends to remain in this position after the plug member is released by the fingers of the user. The plug member may also be adjusted by finger pressure from the positions of Fig. 13 or 14 to a fully opened and tipped position similar to Fig. 5, or the fully opened and locked position of Fig. 15. In the position of Fig. 15, the plug member is tipped to the extent that one of the pin-like projections 34 is engaged with the annular shoulder 44 so that when finger pressure on the plug member is relieved the last-mentioned member is locked or held in its fully opened and tipped position. Thus the plug member may be quickly moved by finger pressure from the fully closed position, for example, to a fully opened and locked position. This convenience is of considerable importance. The locking engagement of one of the cap projections 34 with the plug member is shown in Fig. 17. As shown in the last-mentioned view, the lower end of the cap projection engages only the rim or edge of the shoulder 44. The projection may also engage the tapered portion 39 of the plug member in the manner shown in the last-mentioned view.

The cap projections are preferably of sufficient number to prevent the upper portion of the plug member from tipping to a position in which it rests against one side of the dispensing orifice. This is effected by engagement of the cap projections with the plug member. When the plug member is locked these projections hold the plug member in only a slightly tipped position so that condiment may flow completely around the plug member. It will be understood that if the plug member rests against the side of the dispensing opening in the cap the flow of condiment is cut off at this point, that is, it does not flow out of the dispensing orifice completely around the plug member. The tapered portion 43 facilitates the flow of condiment from the dispensing opening. To release the plug member from the locked or held position of Fig. 15 it is only necessary to press the outer end of the plug member toward the center of the dispensing orifice with a finger so that the annular shoulder 44 of the member clears the cap projection. It will be understood that when the plug member is in the adjusted position of Fig. 13, the projections on the cap, like the projections on the above-described cap 11, serve to maintain the plug member in concentric relation to the dispensing opening.

Instead of the pin-like cap projections of the forms described above, the cap may be provided with a number of pin-like projections like the projection 48 shown in Fig. 18. The cap projection 48, shown in Fig. 18, is identical to each cap projection 34 except for the shape of its distal end and cooperates with a plug member identical to the plug member 33. As shown in the last-mentioned view, the side of the projection 48 nearest the axis of the plug member is rounded at the distal end portion of the projection, as at 49, and the rounded portion merges with a flat inclined portion 50 which forms, in part, the outer side of the projection. The arrangement is such that the projection instead of engaging the outer margin of the shoulder 44 of the plug member has its rounded portion 49 engageable with the shoulder 44 approximately midway between the inner and outer margins of the latter, as shown in Fig. 18. The rounded portion 49 of the projection is also engageable with the tapered portion 39 of the plug member, as shown in the last-mentioned view.

In accordance with the foregoing disclosure there is provided an improved condiment shaker of the type incorporating a threaded and resiliently mounted valve or plug member. There is also provided a condiment shaker having an improved valve or plug member for cooperation with an improved casing structure. Furthermore, the shaker is of pleasing appearance and may not be readily rendered inoperative by tampering. Still further, there is provided a condiment shaker which may be readily formed of plastic and wood materials and which may be produced at low cost.

While three forms of the condiment shaker have been illustrated in the drawings and described above, it will be understood by those versed in the art that various changes in the details of the shaker may be made without departing from the principles of the invention and the scope of the appended claims.

What I claim is:

1. A condiment shaker comprising an upstanding casing having a dispensing opening in the top thereof, an upwardly extending plug member having upper and lower portions provided with opposite tapers, for cooperation with the dispensing opening, the member having a concentric dead-end bore extending upwardly through the lower extremity thereof and threaded throughout at least a portion of its length to provide at least two full turns, and an upwardly arranged coil spring member having a lower terminal portion secured to the side wall structure of the casing within the upper portion of the latter, the upper part of the coil spring member being of screw form and of greatly reduced diameter, and the screw part being threaded into said threaded bore portion of the plug member to resiliently support said last-mentioned member, the plug member being threadedly adjustable up and down on the screw part to vary the effective size of the dispensing opening.

2. A condiment shaker comprising an upstanding casing having a dispensing opening in the top thereof, an upwardly extending tapered plug member for cooperation with the dispensing opening and having a part of larger diameter than the opening in the casing, the member having a concentric dead-end bore extending upwardly through the lower extremity thereof and enlarged at the lower end thereof, at least part of the bore above the enlargement being threaded to provide at least two full turns, and an upwardly arranged coil spring member having the lower terminal portion thereof secured to the side wall structure of the casing within the upper portion of the latter, the upper part of the coil spring member being of screw form and of greatly reduced diameter, and the screw part being threaded into said threaded part of the plug member to resiliently support the last-mentioned member, the plug member being threadedly adjustable up and down on said screw part to vary the size of the dispensing opening, the screw part of the spring member being held captive in the enlargement of the bore to prevent separation of the plug member and the spring member when the plug member is engaged with the top of the casing and the plug member is unthreaded from the screw part.

3. A condiment shaker comprising an upstanding casing having a dispensing opening in the top thereof, an upwardly extending plug member for cooperation with the dispensing opening, the member having a concentric bore extending upwardly through the lower extremity thereof and threaded throughout at least a portion of its length, and an upwardly arranged coil spring member having the lower terminal portion thereof secured to the side wall structure of the casing within the upper portion of the latter, the upper part of the coil spring member being of screw form and of greatly reduced diameter and being interconnected to the lower terminal portion by a sharply inwardly directed turn of the coil spring member, and the screw part being threaded into said threaded bore portion of the plug member to resiliently support the last-mentioned member, the plug member being threadedly adjustable up and down on said screw part to vary the effective size of the dispensing opening, the effective size of the dispensing opening also being adjustable by downward finger pressure on the plug member, the lower terminal portion of the spring being provided with an inwardly directed stop part for cooperation with said turn of the coil spring member to limit dislocation of the latter when the plug member is depressed by finger pressure.

4. A condiment shaker comprising an upstanding casing having a dispensing opening in the top thereof, an upwardly extending plug member for cooperation with the dispensing opening, the member having a concentric bore extending upwardly through the lower extremity thereof and threaded throughout at least a portion of its length, and an upwardly arranged coil spring member having at the lower terminal portion thereof a plurality of turns of substantially uniform diameter, said terminal portion being secured to the side wall structure of the casing within the upper portion of the latter, said turns approximating the internal diameter of said upper portion, the upper part of the coil spring member being of screw form and of greatly reduced diameter and being interconnected to the lower terminal portion by a sharply inwardly directed turn of the member, and the screw part being threaded into said threaded bore portion of the plug member to resiliently support the last-mentioned member, the plug member being threadedly adjustable up and down on said screw part to vary the effective size of the dispensing opening, the effective size of the dispensing opening also being adjustable by downward finger pressure on the plug member, one of the turns of said lower terminal portion of the spring member being provided with an inwardly directed stop part for cooperation with said sharply inwardly directed turn to limit dislocation of the latter when the plug member is depressed by finger pressure.

5. A condiment shaker comprising an upstanding body, a removable cap on the body having a dispensing opening in the top thereof, a coil spring in the cap, a plug member for cooperation with the dispensing opening and having a threaded connection to the coil spring for support by the latter, the plug member being threadedly adjustable up and down on the coil spring to vary the effective size of the dispensing opening and having a fluted outer tip, the body having a complemental recess formed therein to receive said tip and turn the plug member when the cap is removed from the body and the plug member is pressed upwardly and held in raised position by finger pressure from below the plug member.

6. A condiment shaker comprising an upstanding casing having a dispensing opening in the top thereof, an upwardly arranged coil spring member having the lower terminal portion thereof secured to the side wall structure of the casing within the upper portion of the latter, the upper part of the coil spring member being of helical form and of greatly reduced diameter and being interconnected to the lower terminal portion by a sharply inwardly directed turn of the coil spring member, and a plug member for cooperation with the dispensing opening and having a threaded connection to the coil spring member for support by the latter, the plug member being threadedly adjustable up and down on the spring member to vary the effective size of the dispensing opening, the effective size of the dispensing opening also being adjustable by downward finger pressure on the plug member, the lower terminal portion of the coil spring member being provided with an inwardly directed stop part for cooperation with said turn of the coil spring member to limit dislocation of the latter when the coil spring is depressed by finger pressure.

7. A condiment shaker comprising an upstanding casing having a dispensing opening in the top thereof, an upwardly arranged coil spring member having the lower terminal portion thereof secured to the side wall structure of the casing within the upper portion of the latter, the upper part of the coil spring member being interconnected to the lower terminal portion by a sharply inwardly directed turn of the coil spring, a plug member for cooperation with the dispensing opening and connected to the upper part of the coil spring member for support by the latter, the plug member being adjustable by downward finger pressure to vary the effective size of the dispensing opening, the lower terminal portion of the spring being provided with an inwardly directed stop part for cooperation with said turn of the coil spring member to limit dislocation of the latter when the plug member is depressed.

8. A condiment shaker comprising an upstanding casing having a dispensing opening in the top thereof, the casing having a series of pin-like projections suspended from the top thereof and arranged circumferentially of the opening in spaced-apart relation, an upwardly arranged coil spring member having the lower terminal portion thereof secured to the side wall structure of the casing within the upper portion of the latter, the upper part of the coil spring member being interconnected to the lower terminal portion by a sharply inwardly directed turn of the coil spring, a plug member for cooperation with the dispensing opening and connected to the upper part of the coil spring member for support by the latter, the plug member being adjustable by downward finger pressure to vary the effective size of the dispensing opening, the lower terminal portion of the spring being provided with an inwardly directed stop part for cooperation with said turn of the coil spring member to limit dislocation of the latter when the plug member is depressed, and the plug member having a circumferential upwardly facing shoulder which in a depressed and tipped position of the last-mentioned member is engageable with the distal end of at least one of the pin-like projections so that the plug member may be releasably held in open position.

9. A condiment shaker as defined in claim 8, wherein the upper portion of each pin-like projection has the form of an inverted cone with its axis inclined with respect to the vertical axis of the casing.

10. A condiment shaker comprising an upstanding casing having a dispensing opening in the top thereof, an upwardly extending tapered plug member for cooperation with the dispensing opening, the member having a lower threaded part, and an upwardly arranged coil spring member having the lower terminal portion thereof secured to the side wall structure of the casing within the upper portion of the latter, the upper part of the coil spring being of screw form and of greatly reduced diameter and being interconnected to the lower terminal portion by a sharply inwardly directed turn of the coil spring member, and the screw part of the member having a threaded connection with said threaded part of the plug member to resiliently support the last-mentioned member, the plug member being threadedly adjustable up and down on said screw part to vary the effective size of the dispensing opening, the effective size of the dispensing opening also being adjustable by downward finger pressure on the plug member, the lower terminal portion of the spring being provided with an inwardly directed stop part for cooperation with said turn of the coil spring member to limit dislocation of the latter when the plug member is depressed by finger pressure.

11. A condiment shaker comprising an upstanding casing having a dispensing opening in the top thereof, an upwardly extending tapered plug member for cooperation with the dispensing opening, the member having a lower threaded part, and an upwardly arranged coil spring member having at the lower terminal portion thereof a plurality of turns of substantially uniform diameter, said terminal portion being secured to the side wall structure of the casing within the upper portion of the latter, said turns approximating the internal diameter of said upper portion, the upper part of the coil spring member being of screw form and of greatly reduced diameter and being interconnected to the lower terminal portion by a sharply inwardly directed turn of the member, and the screw part of the spring member having a threaded connection with said threaded part of the plug member to resiliently support the last-mentioned member, the plug member being threadedly adjustable up and down on said screw part to vary the effective size of the dispensing opening, the effective size of the dispensing opening also being adjustable by downward finger pressure on the plug member, one of the turns of said lower terminal portion of the spring member being provided with an inwardly directed stop part for cooperation with said sharply inwardly directed turn to limit dislocation of the latter when the plug member is depressed by finger pressure.

12. In a closure for a dispensing receptacle, a closure cap having a dispensing opening, a coil spring member having a terminal portion thereof secured to the wall structure of the cap within the latter, the remote terminal of the coil spring member being interconnected to said terminal portion by a sharply inwardly directed turn of the coil spring, a plug member for cooperation with the dispensing opening and connected to said terminal for support by the coil spring member, the plug member being adjustable by inward finger pressure to vary the effective size of the dispensing opening, said terminal portion of the spring member being provided with an inwardly directed stop part for cooperation with said turn of the spring member to limit dislocation of the last-mentioned member when the plug member is depressed.

13. A condiment shaker comprising an upstanding casing having a dispensing opening in the top thereof, a plurality of pin-like projections suspended from the top of the casing and arranged circumferentially of the opening in spaced-apart relation, an upwardly arranged coil spring member having the lower terminal portion thereof secured to the side wall structure of the casing within the upper portion of the latter, the upper part of the coil spring member being interconnected to the lower terminal portion by a sharply inwardly directed turn of the coil spring, a plug member for cooperation with the dispensing opening and connected to the upper part of the coil spring member for support by the latter, the plug member being adjustable by downward finger pressure to vary the effective size of the dispensing opening, said pin-like projections engaging the plug member at spaced points on its periphery to guide the plug member, and the lower terminal portion of the spring member being provided with an inwardly directed stop part for cooperation with said turn of the coil spring member to limit dislocation of the last-mentioned member when the plug member is depressed.

14. A condiment shaker comprising an upstanding casing having a dispensing opening in the top thereof, a series of pin-like projections suspended from the top of the casing and arranged circumferentially of the opening in spaced-apart relation, an upwardly arranged coil spring member having the lower terminal portion thereof secured to the side wall structure of the casing within the upper portion of the latter, a plug member for cooperation with the dispensing opening and connected to the upper terminal of the coil spring member for support by the latter, the plug member having an upper tapered part and having below said part a circumferential upwardly facing shoulder which in a depressed and tipped position of the last-mentioned member is engageable with the distal end of at least one of the pin-like projections so that the plug member may be releasably held in open position.

References Cited in the file of this patent

UNITED STATES PATENTS

| | | |
|---|---|---|
| 141,628 | Chaput | Aug. 12, 1873 |
| 1,723,516 | Kositchek | Aug. 6, 1929 |
| 2,779,518 | Morris | Jan. 29, 1957 |
| 2,792,160 | Jones et al. | May 14, 1957 |